(12) United States Patent
Kim et al.

(10) Patent No.: US 7,719,636 B2
(45) Date of Patent: May 18, 2010

(54) OPTICAL SHEET AND LIQUID CRYSTAL DISPLAY USING THE SAME

(75) Inventors: Changjong Kim, Gumi (KR); Kabjin Hwang, Seoul (KR); Seoungho Lee, Seoul (KR); Cheol Yoon, Gumi (KR); Seungwook Kown, Gumi (KR); Yongsu Kim, Gumi (KR); Byeongheui Han, Gumi (KR)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 12/049,020

(22) Filed: Mar. 14, 2008

(65) Prior Publication Data

US 2008/0225207 A1 Sep. 18, 2008

(30) Foreign Application Priority Data

Mar. 14, 2007 (KR) .................. 10-2007-0025124
Nov. 28, 2007 (KR) .................. 10-2007-0122075

(51) Int. Cl.
*G02F 1/1335* (2006.01)
(52) U.S. Cl. .................. 349/95; 349/64; 349/89; 349/112; 385/901
(58) Field of Classification Search .................. 349/95, 349/56, 64, 89, 112, 122; 385/901, 14, 129, 385/130, 141
See application file for complete search history.

(56) References Cited

U.S. PATENT DOCUMENTS

| 6,157,491 | A | * | 12/2000 | Watanabe et al. | ............ | 359/619 |
| 7,428,027 | B2 | * | 9/2008 | Takayama | .................... | 349/95 |
| 2004/0032546 | A1 | * | 2/2004 | Ito | ................ | 349/96 |
| 2006/0040204 | A1 | * | 2/2006 | Nagahama et al. | ........ | 430/270.1 |
| 2006/0050379 | A1 | * | 3/2006 | Yee et al. | .................... | 359/454 |
| 2008/0225207 | A1 | * | 9/2008 | Kim et al. | ..................... | 349/95 |

FOREIGN PATENT DOCUMENTS

| KR | 10-2005-0102245 A | 10/2005 | |
| KR | 10-2006-0080888 A | 7/2006 | |
| KR | 10-2006-0128587 A | 12/2006 | ............. 385/901 X |

* cited by examiner

*Primary Examiner*—Brian M Healy
(74) *Attorney, Agent, or Firm*—Birch, Stewart, Kolasch & Birch, LLP

(57) ABSTRACT

An embodiment of this document relates to an optical sheet and a liquid crystal display using the same. An optical sheet in accordance with an aspect of this document may comprise a base film, and a plurality of projections including at least one of lenticular lens or micro lens, positioned on one surface of the base film. The projection may comprise a first resin and a plurality of first beads, and about 1 to 10 parts by weight of the first bead based on 100 parts by weight of the first resin.

18 Claims, 16 Drawing Sheets

OPTICAL SHEET AND LIQUID CRYSTAL DISPLAY USING THE SAME

This application claims the benefit of Korean Patent Application No. 10-2007-0025124 filed on Mar. 14, 2007 and Korean Patent Application No. 10-2007-0122075 filed on Nov. 28, 2007, which is hereby incorporated by reference.

BACKGROUND OF THE DISCLOSURE

1. Field of the Disclosure

This document relates to an optical sheet and a liquid crystal display using the same.

2. Description of the Background Art

With the development of the information technology, the market of display devices, that is, connection media between users and information is expanded. In line with this trend, the use of a flat panel display (FPD), such as a liquid crystal display (LCD), organic light emitting diode (OLED), and a plasma display panel (PDP), is increased. Of them, a liquid crystal display, which can implement high resolutions, can be miniaturized and made and can have a large screen size, has been widely used.

A liquid crystal display is classified as a light-receiving type display device. This liquid crystal display can display an image using light received from a backlight unit disposed below a liquid crystal panel.

The backlight unit has a light source, an optical film layer, and so on in order to supply efficient light to the liquid crystal panel. Here, the optical film layer can has a diffusion sheet, an optical sheet, a protecting sheet and the like.

A plurality of sheets comprised of the optical film has a great change in the optical characteristics depending on requirements, structural conditions, etc. Here, a change in the optical characteristics of the optical film layer has an influence on the optical efficiency of the backlight unit and also the display quality of a liquid crystal display.

Accordingly, in order to improve the display quality of the liquid crystal display, it is necessary to continuously research the optical film layer related fields.

SUMMARY OF THE DISCLOSURE

An aspect of this document is to provide an optical sheet and a liquid crystal display using the same, which can improve the optical characteristics.

An optical sheet in accordance with an aspect of this document may comprise a base film, and a plurality of projections including at least one of lenticular lens or micro lens, positioned on one surface of the base film. The projection may comprise a first resin and a plurality of first beads, and about 1 to 10 parts by weight of the first bead based on 100 parts by weight of the first resin.

A liquid crystal display in accordance with another aspect of this document may comprise a light source, an optical sheet including: a base film; a plurality of projections including at least one of lenticular lens or micro lens, positioned on one surface of the base film; and a liquid crystal panel displaying an image using fight produced by the light source. The projection may comprise a first resin and a plurality of first beads, and about 1 to 10 parts by weight of the first bead based on 100 parts by weight of the first resin.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION OF EMBODIMENTS

Reference will now be made in detail embodiments of the invention examples of which are illustrated in the accompanying drawings.

Hereinafter, specific embodiments of this document will be described in detail with reference to the attached drawings.

First Embodiment

Figure 1:
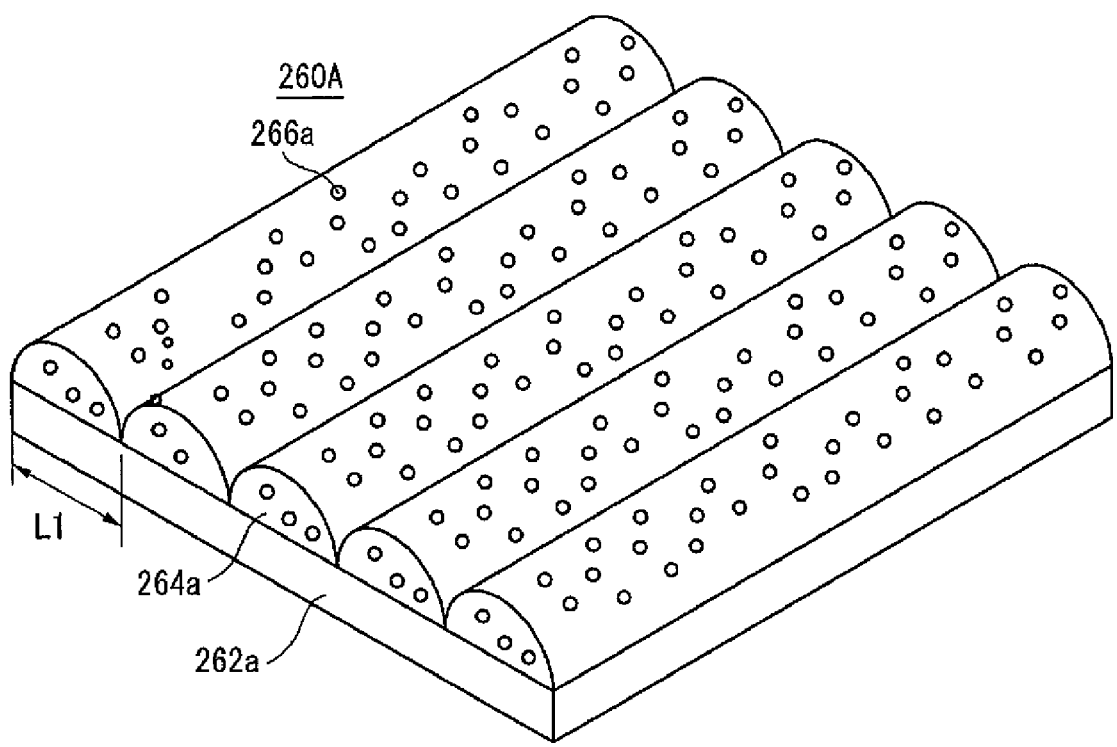
FIGS. 1 to 3 are perspective views showing an optical sheet in accordance with a first embodiment of this document.
Figure 2:
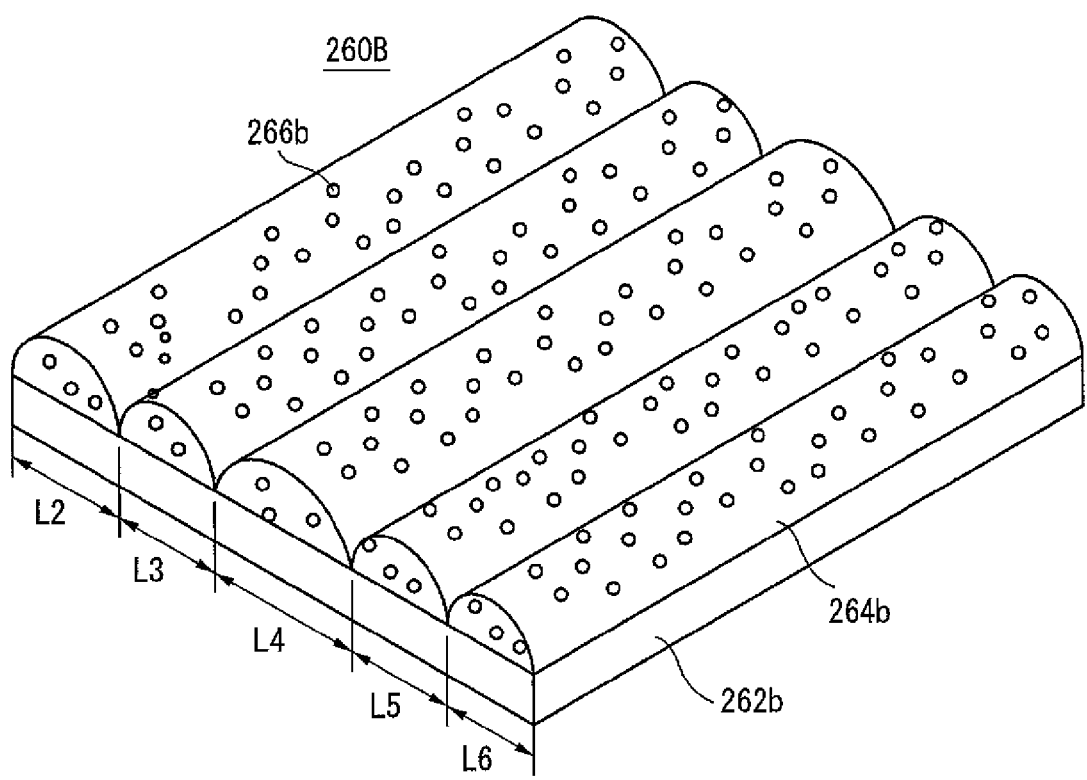
Figure 3:
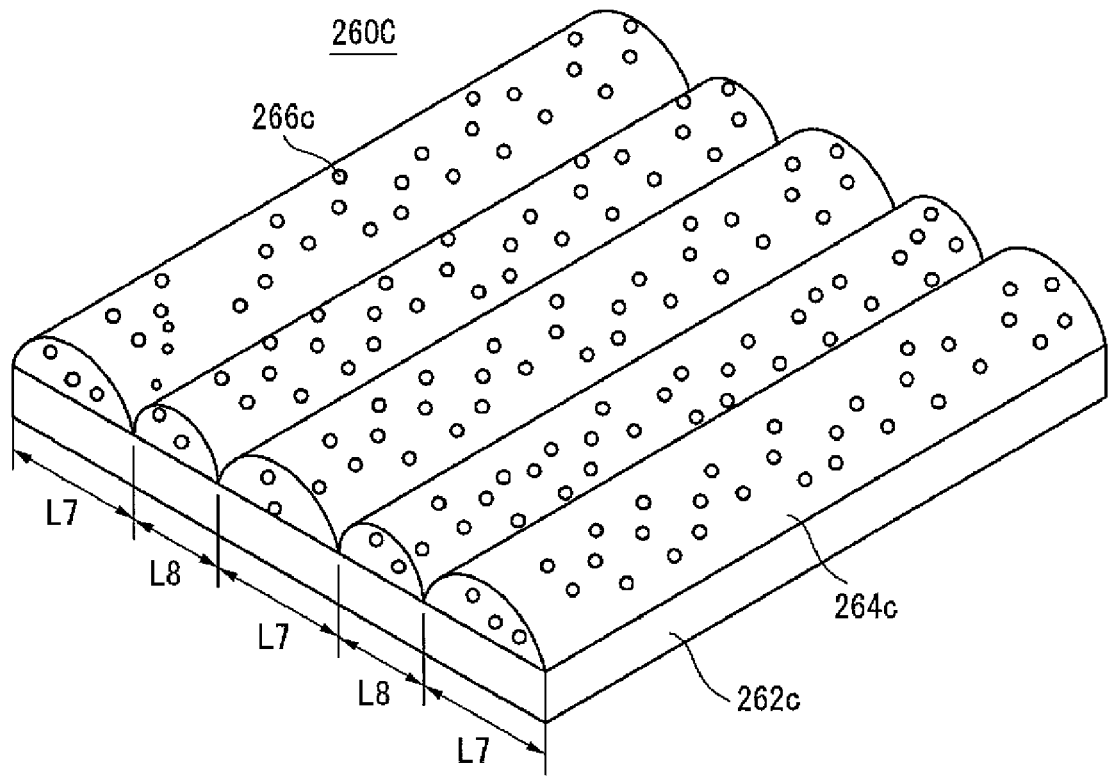

Referring to FIGS. 1 to 3, optical sheets 260A, 260B, and 260C in accordance with a first embodiment of this document may comprise base films 262*a*, 262*b*, and 262*c*, respectively. The optical sheets 260A, 260B, and 260C may also comprise a plurality of projections 264*a*, 264*b*, and 264*c*, respectively, which are positioned on one surfaces of the base films 262*a*, 262*b*, and 262*c*, respectively, and comprise a first resin and first beads 266*a*, 266*b*, and 266*c*, respectively. However, each of the plurality of projections 264*a*, 264*b*, and 264*c* is lenticular lens and the content of each of the first beads 266*a*, 266*b*, and 266*c* is 1 to 10 parts by weight based on 100 parts by weight of the first resin.

The base films 262*a*, 262*b*, and 262*c* may be formed from material with balanced characteristics such as good transmittance, mechanical properties (in particular, shock resistance), heat resistance, and electrical properties. For example, the base films 262*a*, 262*b*, and 262*c* may employ material such as polymethacryl acid methyl, polyacryl acid methyl, polyethylene terephthalate, polybutylene terephthalate, polycarbonate, polystyrene, polyester acrylate or non-saturated polyester, but not limited thereto.

Each of the base films 262a, 262b, and 262c may have a thickness of 20 μm to 1000 μm, but not limited thereto. If each of the base films 262a, 262b, and 262c is 20 μm or higher in thickness, it can be made thin within a range in which the mechanical strength and thermal stability of the sheet can be secured. If the thickness of each of the base films 262a, 262b, and 262c is 1000 μm or less, the mechanical strength and thermal stability of the base film can be secured to a maximum extent within a range in which the flexibility of the sheet can be secured. If the thickness of each of the base films 262a, 262b, and 262c falls within the above range, each of the base films 262a, 262b, and 262c can have an excellent performance in terms of processing and can also have a characteristic in which it is easily bent like a film. However, it is to be understood that those having ordinary skill in the art can properly decide the thickness of each of the base films 262a, 262b, and 262c by taking a condition in which the optical sheets 260A, 260B, and 260C are used into consideration.

The first resin constituting the plurality of projections 264a, 264b, and 264c may be comprised of polymethyl methacrylate (PMMA), polyamide, polyimide, polypropylene, polyurethane or the like, but not limited thereto. However, the first resin constituting the plurality of projections 264a, 264b, and 264c comprise the plurality of first beads 266a, 266b, and 266c, respectively, wherein the content of each of the first beads 266a, 266b, and 266c may have 1 to 10 parts by weight based on 100 parts by weight of the first resin. Explaining in more detail, the fact that the first beads 266a, 266b, and 266c is 4 to 7 parts by weight based on 100 parts by weight of the first resin may be advantageous in terms of a wider viewing angle. It will become more evident with reference to the following Table 1.

TABLE 1

| Part by weight of first bead based on 100 parts by weight of the first resin | Light refractive property |
| --- | --- |
| 0.5 | x |
| 1 | □ |
| 4 | □ |
| 5 | □ |
| 7 | □ |
| 8 | o |
| 9 | o |
| 10 | o |
| 15 | x |
| 20 | x | x: not good
□: normal
o: good
□: very good

Here, the light refractive property can be defined as a degree to indicate the focusing and diffusing effects of light. The optical sheet according this document have a wide viewing angle while maintaining a front luminance of 80% or higher using one sheet because of this light refractive property when compared with the conventional optical sheet (with no bead). However, if the first bead has 0.5 parts by weight or less based on 100 parts by weight of the first resin, the diffusing effect might be lowered significantly, resulting in a narrow viewing angle. Further, if the first bead has 20 parts by weight or more based on 100 parts by weight of the first resin, the focusing effect might be degraded significantly.

If the weight of the first beads 266a, 266b, and 266c included in the plurality of projections 264a, 264b, and 264c, respectively, which constitute the optical sheets 260A, 260B, and 260C, respectively, is set as described above, there is an advantage in that the light refractive property can be further improved.

In the optical sheets 260A, 260B, and 260C of this document, the base films 262a, 262b, and 262c and the plurality of projections 264a, 264b, and 264c may be formed from different materials. In this case, the optical sheets 260A, 260B, and 260C may be formed in such a manner that after the base films 262a, 262b, and 262c are formed, the plurality of projections 264a, 264b, and 264c are formed on one surfaces of the base films 262a, 262b, and 262c, respectively.

Unlike the above method, in the optical sheets 260A, 260B, and 260C of this document, the base films 262a, 262b, and 262c and the plurality of projections 264a, 264b, and 264c may be formed integrally using the same material.

Meanwhile, the plurality of projections 264a, 264b, and 264c of a lenticular lens type may be positioned on one surfaces of the base films 262a, 262b, and 262c, respectively, so that they are adjacent to one another, in order to form a convex shape. The plurality of projections 264a, 264b, and 264c may be extended in one direction. The plurality of projections 264a, 264b, and 264c may function to refract light transmitted from a light guide plate and focus the light in the direction of the liquid crystal panel.

The plurality of projections 264a, 264b, and 264c of a lenticular lens type may be positioned on one surfaces of the base films 262a, 262b, and 262c, respectively, in various ways depending on their widths.

Referring first to the optical sheet 260A of FIG. 1, a width L1 of each of the plurality of projections 264a positioned on one surface of the base film 262a may be constant.

Referring next to the optical sheet 260B of FIG. 2, widths L2, L3, L4, L5, and L6 of the plurality of projections 264b positioned on one surface of the base film 262b may be random.

Referring to the optical sheet 260C of FIG. 3, widths L7 and L8 of the plurality of projections 264c positioned on one surface of the base film 262c may be changed periodically and formed. It is shown that in the optical sheet 260C of FIG. 3, the two widths L7 and L8 are changed periodically and formed. However, three or more widths may be changed periodically and formed.

Assuming that the heights of the plurality of projections 264a, 264b, and 264c in FIGS. 1 to 3 are constant, if the widths of the plurality of projections 264a, 264b, and 264c increase, the curvatures of the plurality of projections 264a, 264b, and 264c decrease, which leads to a reduction in the light refraction effect. Accordingly, when forming the plurality of projections 264a, 264b, and 264c, the widths of the plurality of projections 264a, 264b, and 264c can be controlled depending on a type, arrangement, etc. of a light source in order to focus light in a specific direction.

The first beads 266a, 266b, and 266c included in the first resin constituting the plurality of projections 264a, 264b, and 264c may be formed within or outer surfaces of the plurality of projections 264a, 264b, and 264c, respectively. This can scatter light output through the plurality of projections 264a, 264b, and 264c. The first beads 266a, 266b, and 266c may be formed from transparent material or material having a predetermined haze. For example, the material of the first beads 266a, 266b, and 266c may comprise polymethyl methacrylate (PMMA), silica or the like, but not limited thereto. The sizes of the first beads 266a, 266b, and 266c may be chosen in various ways depending on use environments of the optical sheets 260A, 260B, and 260C. Hence, the sizes of the first beads 266a, 266b, and 266c may be various.

Hereinafter, various shapes of each of the first beads 266a, 266b, and 266c are described.

Referring to FIG. 4(a), the first bead 266a may have a ball shape. This first bead 266a may have an effect of refracting externally incident light twice therein and reflecting the externally incident light once.

Referring to FIG. 4(b), the first bead 266a may have a snowman shape or a closed curve shape in which two ball shapes are connected. This first bead 266a may have an effect in which one side of the bead has externally incident light pass there through and the other side of the bead diffuses the light.

Referring to FIG. 4(c), the first bead 266a may have a random shape. This first bead 266a may have an effect of refracting and reflecting externally incident light at various angles therein and also irregularly reflecting the light.

Referring to FIG. 4(d), the first bead 266a may have sub beads 267a therein. The sub bead 267a may be bubble or formed of material different from that of the first bead 266a. This first bead 266a may have an effect of refracting and reflecting externally incident light at various angles therein and also irregularly reflecting the light.

Meanwhile, unlike shown above, the sub beads 267a included in the first bead 266a may be partially exposed to the outside. Further, the inside of the first bead 266a may be divided into an upper part and a lower part, and the sub beads 267a may be formed within the first bead 266a at different specific gravities.

Figure 5:
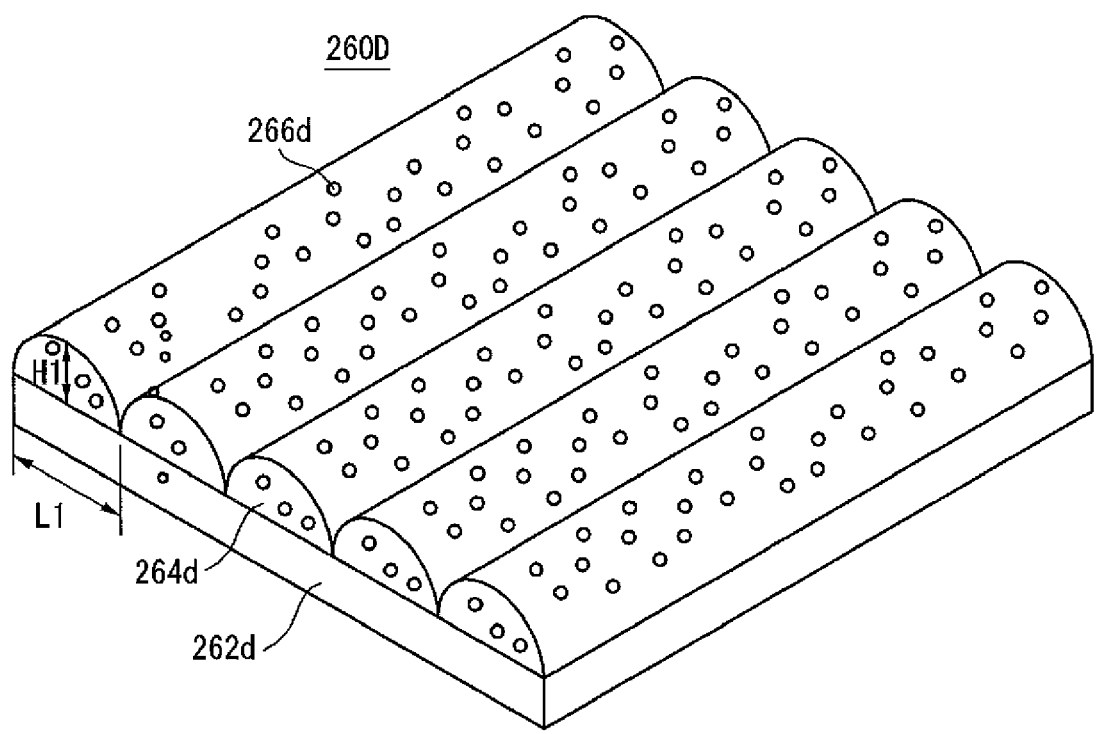
FIGS. 5 to 7 are another perspective views showing an optical sheet in accordance with a first embodiment of this document.
Figure 6:
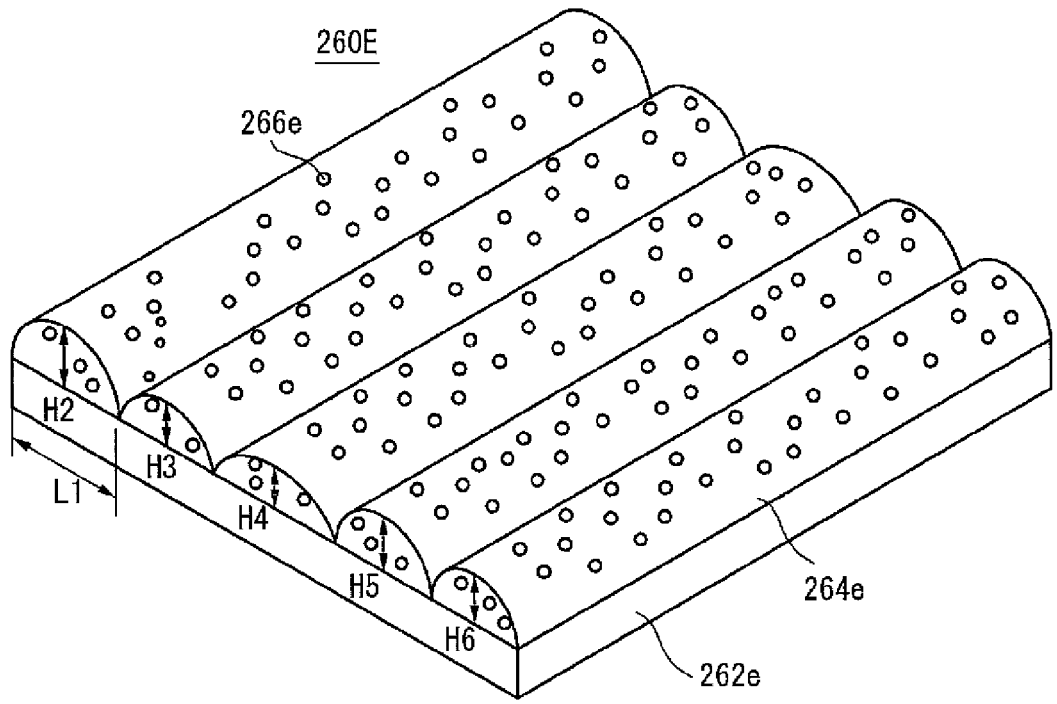
Figure 7:
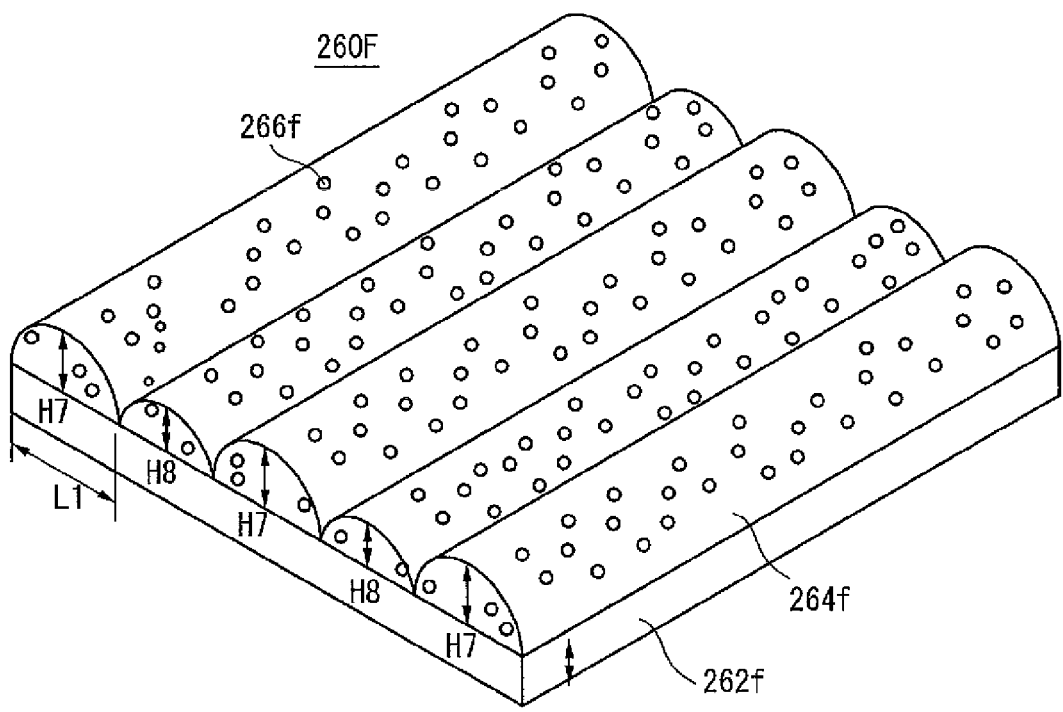

Referring to next to FIGS. 5 to 7, a plurality of projections 264d, 264e, and 264f of a lenticular lens type may be positioned on one surfaces of base films 262d, 262e, 262f, respectively, in various ways depending on their heights.

Referring first to an optical sheet 260D of FIG. 5, a height H1 of the plurality of projections 264d disposed on one surface of the base film 262d may be constant.

Referring next to an optical sheet 260E of FIG. 6, heights H2, H3, H4, H5, and H6 of the plurality of projections 264e disposed on one surface of the base film 262e may be random.

Referring to an optical sheet 260F of FIG. 7, heights H7 and H8 of the plurality of projections 264f disposed on one surface of the base film 262f may be changed periodically and formed. It is shown that in the optical sheet 260F of FIG. 7, the two heights H7 and H8 are changed periodically and formed. However, it is to be understood that three or more heights may be changed periodically and formed. Further, widths L1 of the plurality of projections 264d, 264e, and 264f respectively included in the optical sheets 260D, 260E, and 260F shown in FIGS. 5 to 7 may be constant or random or changed periodically, as described above with reference to FIGS. 1 to 3.

If the heights of the plurality of projections 264e and 264f differ as in the optical sheets 260E and 260F of FIGS. 6, and 7, the amount of physical contact with other sheets, etc. can be reduced, so the moiré phenomenon can be mitigated.

Figure 8:
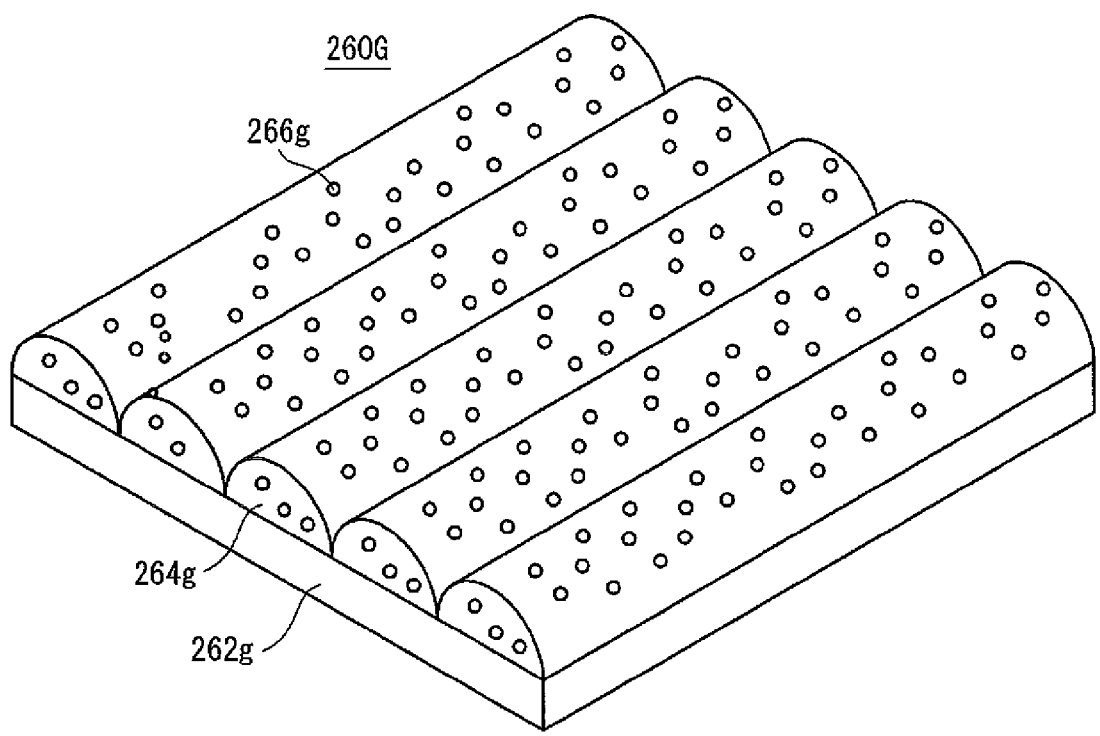
FIGS. 8 and 9 are still another perspective views showing an optical sheet in accordance with a first embodiment of this document.
Figure 10:
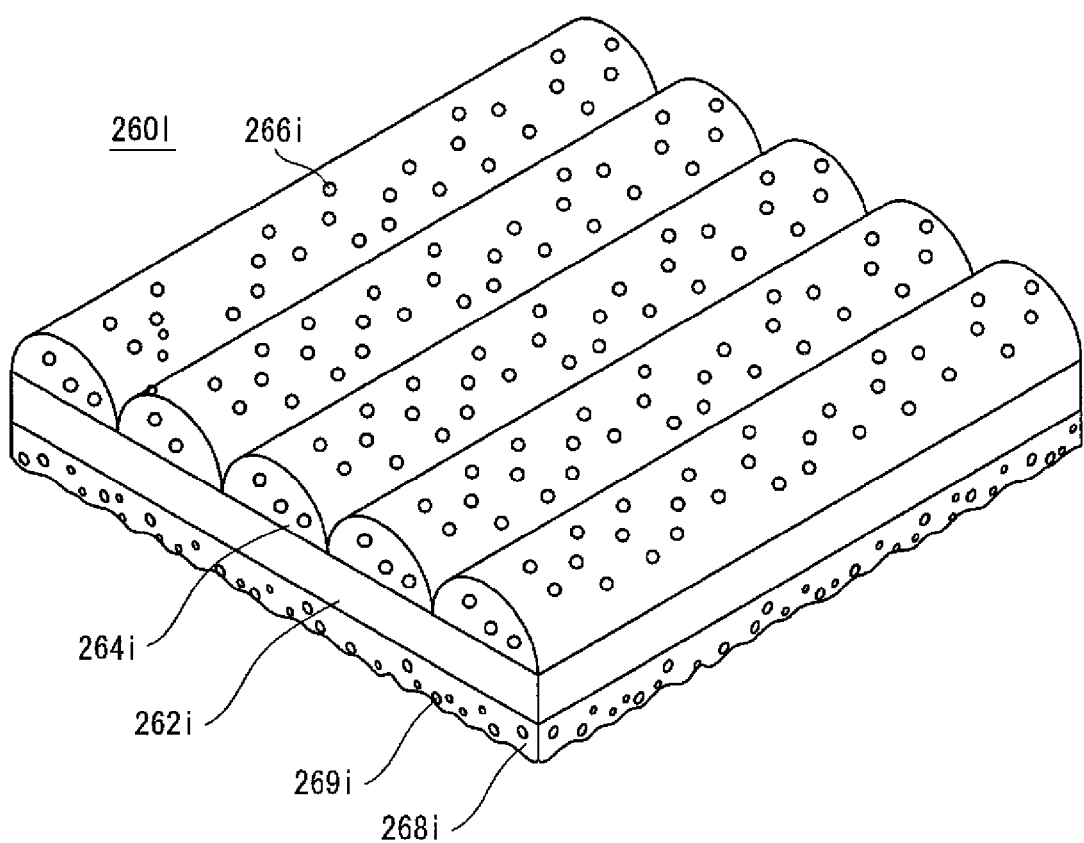
FIG. 10 is a further still another perspective view showing an optical sheet in accordance with a first embodiment of this document.

Referring to FIGS. 8 and 10, first beads 266g and 266h included in the first resin constituting the plurality of projections 264g and 264h, respectively, may be arranged according to the following shapes.

Referring to the optical sheet 260G of FIG. 8, the first beads 266g may be formed randomly on outer surfaces of the plurality of projections 264g. When the first beads 266g are randomly formed on the outer surfaces of the plurality of projections 264g as described above, the scattering effect of light through the entire optical sheet 260G can be increased when compared with a case where the first beads 266g are formed periodically.

Figure 9:
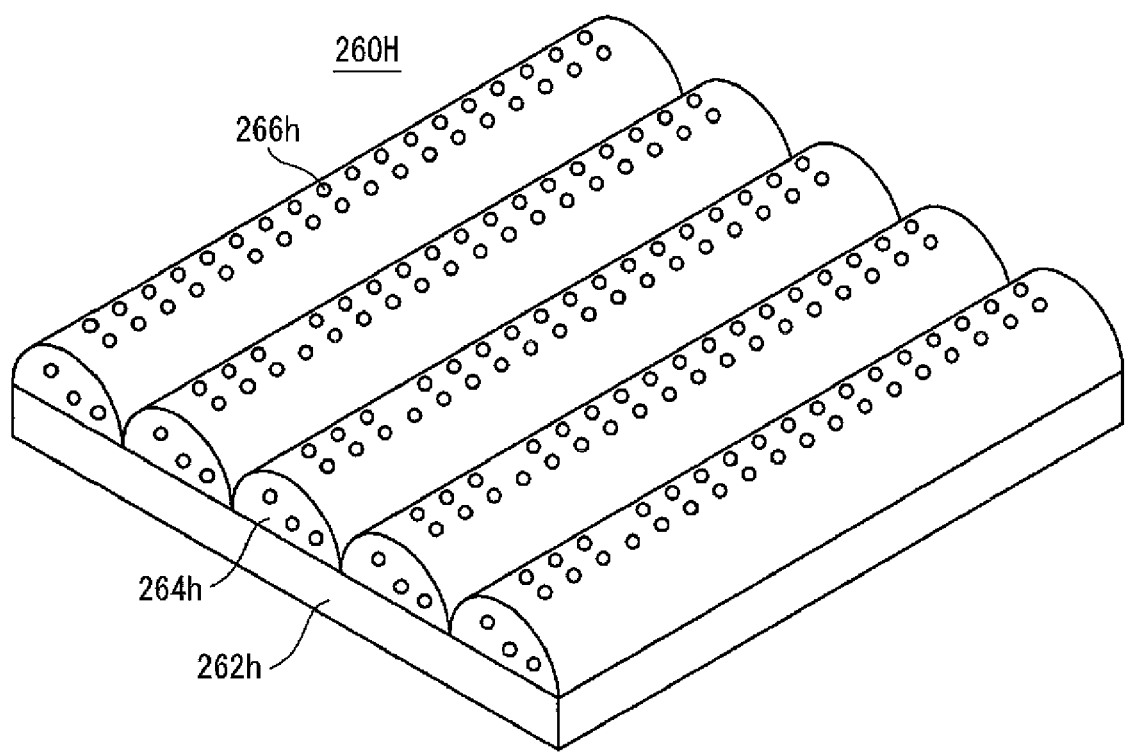

Referring to the optical sheet 260H of FIG. 9, the first beads 266h may be formed on outer surfaces of the plurality of projections 264h so that they have a regular pattern. In the case where light output through the optical sheet 260H is concentrated on a specific area, the luminance of light output through the entire optical sheet 260H can become uniform by forming the first beads 266h on the area in such a way to have a periodical pattern. However, it is to be understood that the periodical pattern is not limited to the above pattern shown in FIG. 9.

Meanwhile, each of the optical sheets 260A, 260B, 260C, 260D, 260E, 260F, 260G, and 260H shown in FIGS. 1 to 3 and 5 to 9 may further comprise a protecting layer 268i, which is positioned on the other surface of a base film 262i and comprises second beads 269i as in an optical sheet 260I of FIG. 10.

A second resin constituting the protecting layer 268i may be formed from polymethylmethacrylate, polyamide, polyimide, polypropylene, polyurethane or the like, but not limited thereto.

The second beads 269i included in the protecting layer 268i may be formed from polymethyl methacrylate (PMMA), silica or the like, but not limited thereto.

However, the content of the second beads 269i may be 10 to 50 parts by weight based on 100 parts by weight of the second resin constituting the protecting layer 268i. Here, the content of first beads 266i included in a plurality of projections 264i may be 1 to 10 parts by weight based on 100 parts by weight of the first resin as described above. In the case where the protecting layer 268i is positioned on the other surface of the base film 262i as described above, it may be advantageous for the content of the first beads 266i to be 4 to 7 parts by weight based on 100 parts by weight of the first resin and the content of the second beads 269i to be 10 to 30 parts by weight based on 100 parts by weight of the second resin in terms of a wider viewing angle. It will become more evident with reference to the following table 2.

TABLE 2

| Part by weight of first bead based on 100 parts by weight of the first resin | Part by weight of first bead based on 100 parts by weight of the second resin | Light refractive property |
| --- | --- | --- |
| 0.5 | 1 | x |
| 1 | 5 | □ |
| 4 | 10 | □ |
| 5 | 20 | □ |
| 7 | 30 | □ |
| 8 | 40 | o |
| 9 | 50 | o |
| 10 | 60 | o |
| 15 | 70 | x |
| 20 | 80 | x | x: not good
□: normal
o: good
□: very good

If the weight of the first beads 266i and the second beads 269i respectively included in the plurality of projections 264i and the protecting layer 268i constituting the optical sheets is set as described above, there is an effect that the light refractive property is further improved.

It is shown in Table 2 the weight of the first beads 266i and the weight of the second beads 269i, which are set identically and the degree of light refractive property accordingly. However, the weights of the first beads 266i and the second beads 269i included in the plurality of projections 264i and the protecting layer 268i, respectively, may be included in different ratios.

Second Embodiment

Figure 11:
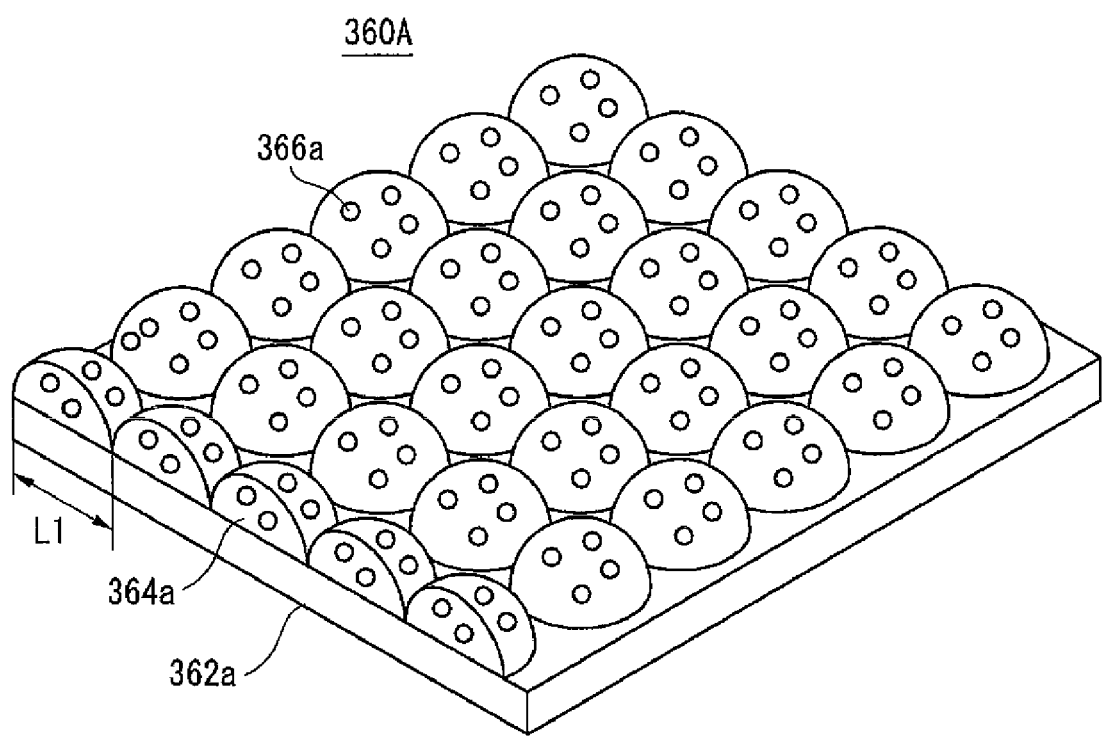
FIGS. 11 to 13 are perspective views showing an optical sheet in accordance with a second embodiment of this document.
Figure 12:
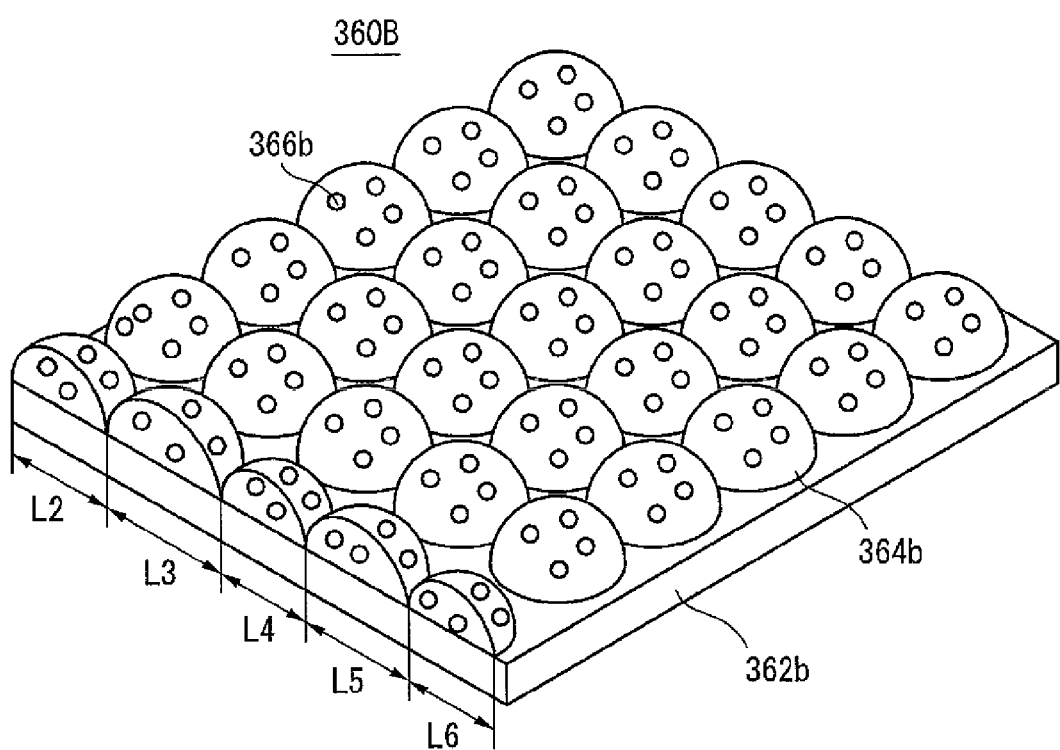
Figure 13:
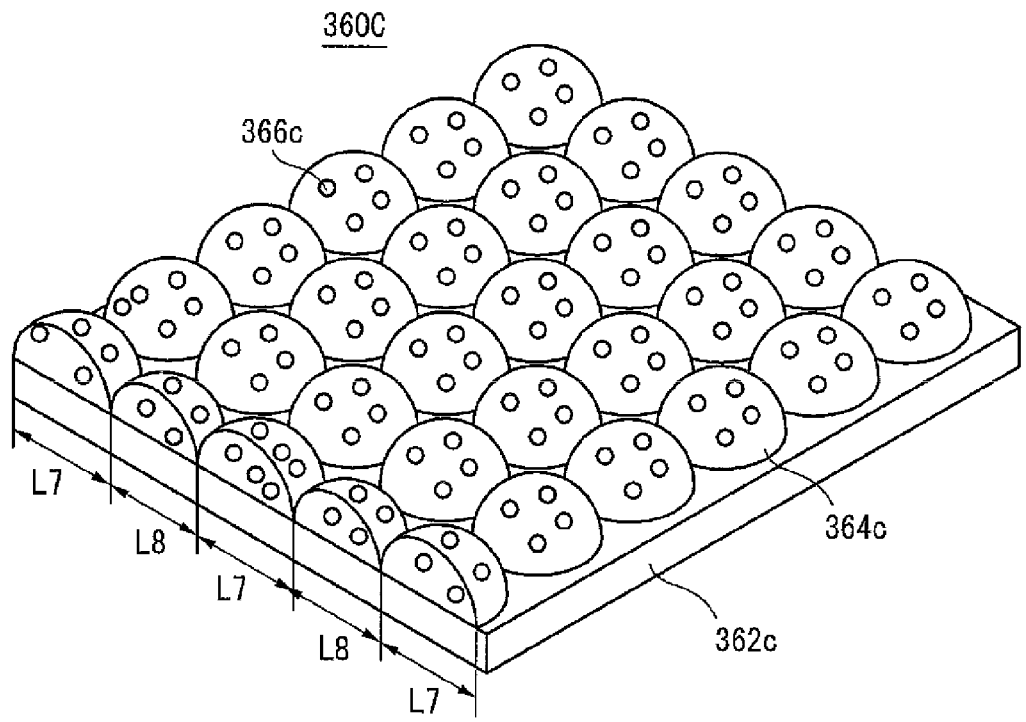

Referring to FIGS. 11 to 13, optical sheets 360A, 360B and 360C in accordance with a second embodiment of this document may comprise base films 362a, 362b, and 362c, respectively. The optical sheets 360A, 360B and 360C may further comprise a plurality of projections 364a, 364b, and 364c, respectively, which are positioned on one surfaces of the base films 362a, 362b, and 362c, respectively, and comprise a first resin and first beads 366a, 366b, and 366c, respectively. However, the plurality of projections 364a, 364b, and 364c are micro lens and the content of each of the first beads 366a, 366b, and 366c is 1 to 10 parts by weight based on 100 parts by weight of the first resin.

The base films 362a, 362b, and 362c may be formed from material with balanced characteristics such as good transmittance, mechanical properties (in particular, shock resistance), heat resistance, and electrical properties. For example, the base films 362a, 362b, and 362c may employ material such as polymethacryl acid methyl, polyacryl acid methyl, polyethylene terephthalate, polybutylene terephthalate, polycarbonate, polystyrene, polyester acrylate or non-saturated polyester, but not limited thereto.

Each of the base films 362a, 362b, and 362c may have a thickness of 20 μm to 1000 μm, but not limited thereto. If each of the base films 362a, 362b, and 362c is 20 μm or higher in thickness, it can be made thin within a range in which the mechanical strength and thermal stability of the sheet can be secured. If the thickness of each of the base films 362a, 362b, and 362c is 1000 μm or less, the mechanical strength and thermal stability of the base film can be secured to a maximum extent within a range in which the flexibility of the sheet can be secured. If the thickness of each of the base films 362a, 362b, and 362c falls within the above range, each of the base films 362a, 362b, and 362c can have an excellent performance in terms of processing and can also have a characteristic in which it is easily bent like a film. However, it is to be understood that those having ordinary skill in the art can properly decide the thickness of the base films 362a, 362b, and 362c by taking a condition in which the optical sheets 360A, 360B, and 360C are used into consideration.

The first resin constituting the plurality of projections 364a, 364b, and 364c may be comprised of polymethyl methacrylate (PMMA), polyamide, polyimide, polypropylene, polyurethane or the like, but not limited thereto. However, the first resin constituting the plurality of projections 364a, 364b, and 364c comprise the plurality of first beads 366a, 366b, and 366c, respectively, wherein the content of each of the first beads 366a, 366b, and 366c may have 1 to 10 parts by weight based on 100 parts by weight of the first resin. Explaining in more detail, the fact that the content of each of the first beads 366a, 366b, and 366c has 4 to 7 parts by weight based on 100 parts by weight of the first resin may be advantageous in terms of a wider viewing angle. It will become more evident with reference to the following Table 3.

TABLE 3

| Part by weight of first bead based on 100 parts by weight of the first resin | Light refractive property |
|---|---|
| 0.5 | x |
| 1 | □ |
| 4 | □ |
| 5 | □ |
| 7 | □ |
| 8 | o |
| 9 | o |
| 10 | o |
| 15 | x |
| 20 | x | x: not good
□: normal
o: good
▣: very good

If the weight of the first beads 366a, 366b, and 366c included in the plurality of projections 364a, 364b, and 364c, respectively, which constitute the optical sheets 360A, 360B, and 360C, respectively, is set as described above, there is an advantage in that the light refractive property can be further improved.

In the optical sheets 360A, 360B, and 360C of this document, the base films 362a, 362b, and 362c may be formed from a material different from that of the plurality of projections 364a, 364b, and 364c. In this case, the optical sheets 360A, 360B, and 360C may be formed in such a manner that the base films 362a, 362b, and 362c are first formed the plurality of projections 364a, 364b, and 364c is then formed on one surfaces of the base films 362a, 362b, and 362c, respectively.

Unlike the above method, in the optical sheets 360A, 360B, and 360C of this document, the base films 362a, 362b, and 362c may be formed integrally with the plurality of projections 364a, 364b, and 364c using the same material.

Meanwhile, the plurality of projections 364a, 364b, and 364c of a micro lens type may be positioned on one surfaces of the base films 362a, 362b, and 362c, respectively, so that they are adjacent to one another, in order to form a convex semispherical shape. The plurality of projections 364a, 364b, and 364c may be extended in one direction. The plurality of projections 364a, 364b, and 364c may function to refract light transmitted from a light guide plate and focus the light in the direction of the liquid crystal panel.

The plurality of projections 364a, 364b, and 364c of a micro lens type may be positioned on one surfaces of the base films 362a, 362b, and 362c, respectively, in various ways depending on their widths.

Referring first to the optical sheet 360A of FIG. 11, a width L1 of each of the plurality of projections 364a positioned on one surface of the base film 362a may be constant.

Referring next to the optical sheet 360B of FIG. 12, widths L2, L3, L4, L5, and L6 of the plurality of projections 364b positioned on one surface of the base film 362b may be random.

Referring to the optical sheet 360C of FIG. 13, widths L7 and L8 of the plurality of projections 364c positioned on one surface of the base film 362c may be changed periodically and formed. It is shown that in the optical sheet 360C of FIG. 13, the two widths L7 and L8 are changed periodically and formed. However, three or more widths may be changed periodically and formed.

Assuming that the heights of the plurality of projections 364a, 364b, and 364c in FIGS. 11 to 13 are constant, if the widths of the plurality of projections 364a, 364b, and 364c increase, the curvatures of the plurality of projections 364a, 364b, and 364c decrease, which leads to a reduction in the light refraction effect. Accordingly, when forming the plurality of projections 364a, 364b, and 364c, the widths of the plurality projections 364a, 364b, and 364c can be controlled depending on a type, arrangement, etc. of a light source in order to focus light in a specific direction.

The first beads 366a, 366b, and 366c respectively included in the first resin constituting the plurality of projections 364a, 364b, and 364c, respectively, may be formed within or outer surfaces of the plurality of projections 364a, 364b, and 364c, respectively. This can scatter light output through the plurality of projections 364a, 364b, and 364c. The first beads 366a, 366b, and 366c may be formed from transparent material or material having a predetermined haze. For example, the material of the first beads 366a, 366b, and 366c may comprise polymethyl methacrylate (PMMA), silica or the like, but not limited thereto. The sizes of the first beads 366a, 366T, and 366c may be chosen in various ways depending on use environments of the optical sheets 360A, 360B, and 360C. Hence, the sizes of the first beads 366a, 366b, and 366c may be various.

Hereinafter, various shapes of each of the first beads 366a, 366b, and 366c are described.

Referring to FIG. 14(a), the first bead 366a may have a ball shape. This first bead 366a may have an effect of refracting externally incident light twice therein and reflecting the externally incident light once.

Referring to FIG. 14(b), the first bead 366a may have a snowman shape or a closed curve shape in which two ball shapes are connected. This first bead 366a may have an effect in which one side of the bead has externally incident light pass there through and the other side of the bead diffuses the light.

Referring to FIG. 14(c), the first bead 366a may have a random shape. This first bead 366a may have an effect of refracting and reflecting externally incident light at various angles therein and also irregularly reflecting the light.

Referring to FIG. 14(d), the first bead 366a may have sub beads 367a therein. The sub bead 367a may be bubble or formed of material different from that of the first bead 366a. This first bead 366a may have an effect of refracting and reflecting externally incident light at various angles therein and also irregularly reflecting the light.

Meanwhile, unlike shown above, the sub beads 367a included in the first bead 366a may be partially exposed to the outside. Further, the inside of the first bead 366a may be divided into an upper part and a lower part, and the sub beads 367a may be formed within the first bead 366a at different specific gravities.

Figure 15:
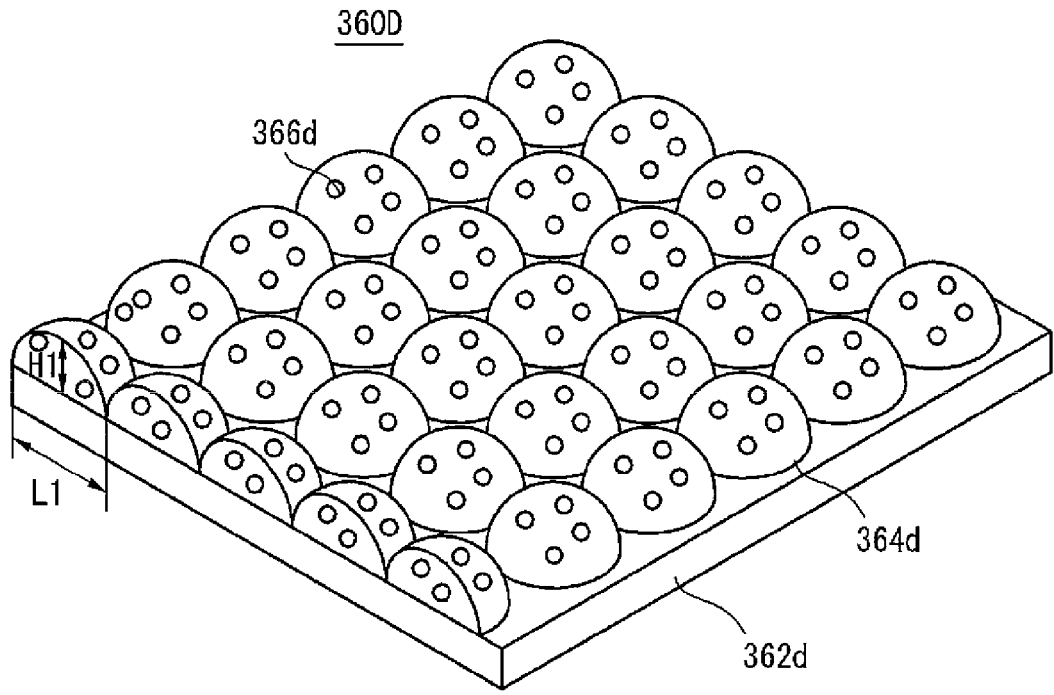
FIGS. 15 to 17 are another perspective views showing an optical sheet in accordance with a second embodiment of this document.
Figure 16:
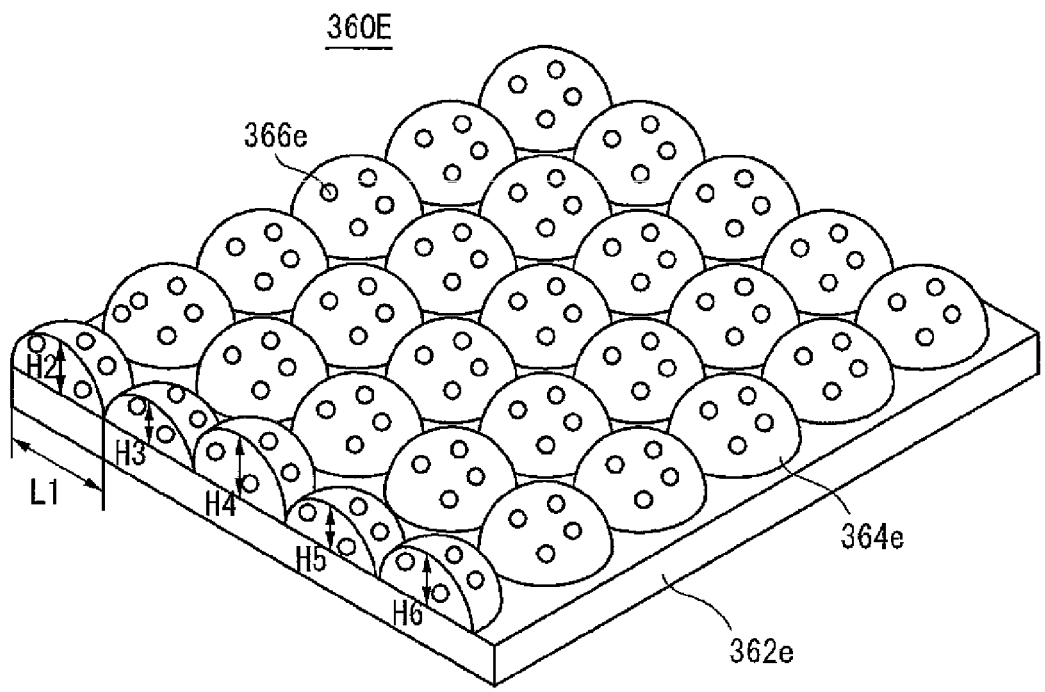
Figure 17:
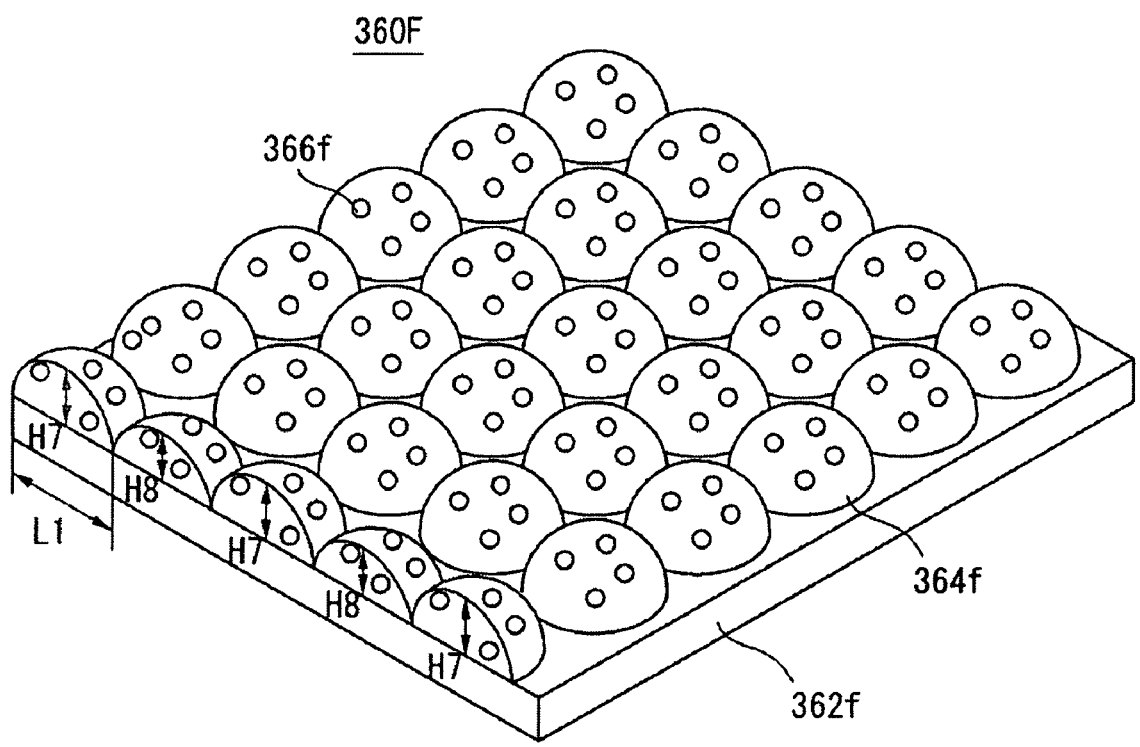

Referring to next to FIGS. 15 to 17, a plurality of projections 364d, 364e, and 364f of a micro lens type may be positioned on one surfaces of base films 362d, 362e, 362f, respectively, in various ways depending on their heights.

Referring first to an optical sheet 360D of FIG. 15, a height H1 of the plurality of projections 364d disposed on one surface of the base film 362d may be constant.

Referring next to an optical sheet 360E of FIG. 16, heights H2, H3, H4, H5, and H6 of the plurality of projections 364e disposed on one surface of the base film 362e may be random.

Referring to an optical sheet 360F of FIG. 17, heights H7 and H8 of the plurality of projections 364f disposed on one surface of the base film 362f may be changed periodically and formed. It is shown that in the optical sheet 360F of FIG. 17, the two heights H7 and H8 are changed periodically and formed. However, it is to be understood that three or more heights may be changed periodically and formed.

Further, widths L1 of the plurality of projections 364d, 364e, and 364f respectively included in the optical sheets 360D, 360E, and 360F shown in FIGS. 15 to 17 may be constant or random or changed periodically, as described above with reference to FIGS. 11 to 13.

If the heights of the plurality of projections 364e and 364f differ as in the optical sheets 360E and 360F of FIGS. 16, and 17, the amount of physical contact with other sheets, etc. can be reduced, so the moiré phenomenon can be mitigated.

Further, first beads 366d, 366e, and 366f, which respectively constitute the plurality of projections 364d, 364e, and 364f included in the first resin included in the optical sheets 360D, 360E, and 360F, respectively, shown in FIGS. 15 to 17, may be formed randomly on outer surfaces of the plurality of projections 364d, 364e, and 364f, respectively. If the first beads 366d, 366e, and 366f are formed randomly on outer surfaces of the plurality of projections 364d, 364e, and 364f, respectively, as described above, the scattering effect of light through the entire optical sheets 360D, 360E, and 360F can be increased when compared with a case where the first beads 366d, 366e, and 366f are formed regularly.

Further, the first beads 366d, 366e, and 366f included in the optical sheets 360D, 360E, and 360F shown in FIGS. 15 to 17 may be formed on outer surfaces of the plurality of projections 364d, 364e, and 364f so that they have a regular pattern. In the case where light output through each of the optical sheets 360D, 360E, and 360F is concentrated on a specific area, the luminance of light output through the entire optical sheets 360D, 360E, and 360P, respectively, can become uniform by forming the first beads 366d, 366e, and 366f on the area in such a way to have a periodical pattern.

Figure 18:
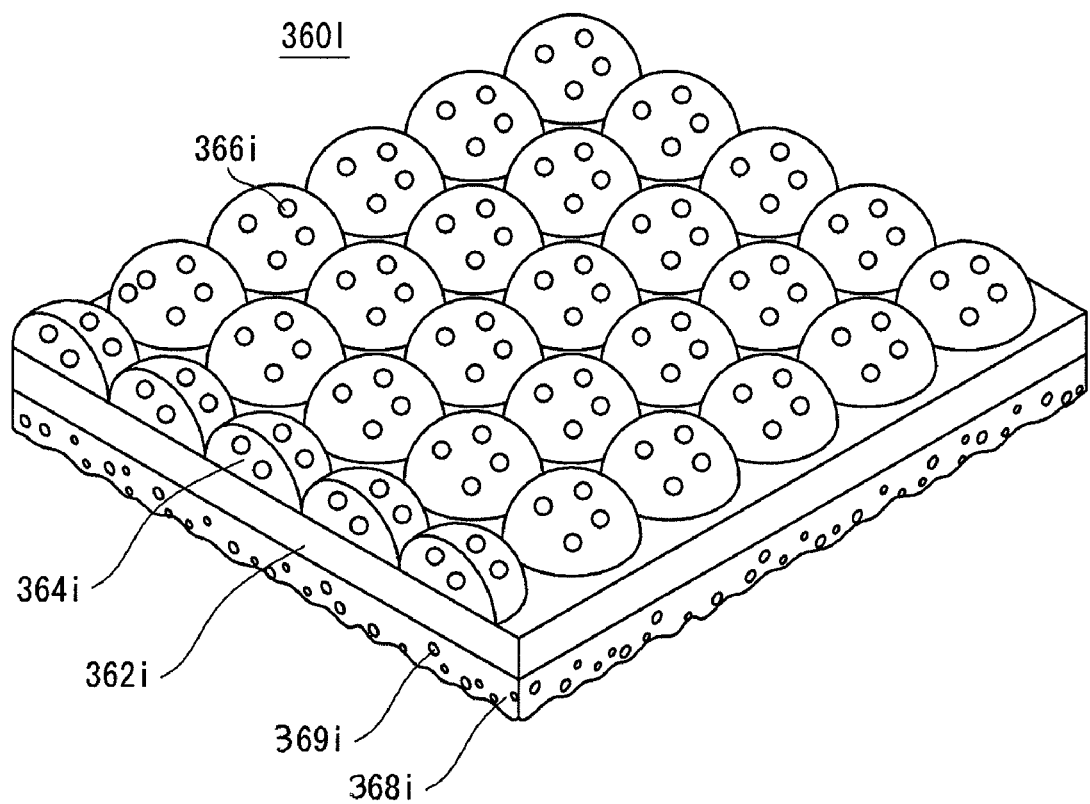
FIG. 18 is a still another perspective view showing an optical sheet in accordance with a second embodiment of this document.

Meanwhile, each of the optical sheets 360A, 360B, 360C, 360D, 360E, and 360F shown in FIGS. 11 to 13 and 15 to 17 may further comprise a protecting layer 368i, which is positioned on the other surface of a base film 362i and comprises second beads 369i as in an optical sheet 360I of FIG. 18.

A second resin constituting the protecting layer 368i may be formed from polymethyl methacrylate, polyamide, polyimide, polypropylene, polyurethane or the like, but not limited thereto.

The second beads 369i included in the protecting layer 368i may be formed from polymethyl methacrylate (PMMA), silica or the like, but not limited thereto.

However, the content of the second beads 369i may be 10 to 50 parts by weight based on 100 parts by weight of the second resin constituting the protecting layer 368i. Here, the content of first beads 366i included in a plurality of projections 364i may be 1 to 10 parts by weight based on 100 parts by weight of the first resin as described above. In the case where the protecting layer 368i is positioned on the other surface of the base film 362i as described above, it may be advantageous for the content of the first beads 366i to be 4 to 7 parts by weight based on 100 parts by weight of the first resin and the content of the second beads 369i to be 10 to 30 parts by weight based on 100 parts by weight of the second resin in terms of a wider viewing angle. It will become more evident with reference to the following table 4.

TABLE 4

| Part by weight of first bead based on 100 parts by weight of the first resin | Part by weight of first bead based on 100 parts by weight of the second resin | Light refractive property |
| --- | --- | --- |
| 0.5 | 1 | x |
| 1 | 5 | ☐ |

TABLE 4-continued

| Part by weight of first bead based on 100 parts by weight of the first resin | Part by weight of first bead based on 100 parts by weight of the second resin | Light refractive property |
|---|---|---|
| 4 | 10 | □ |
| 5 | 20 | □ |
| 7 | 30 | □ |
| 8 | 40 | o |
| 9 | 50 | o |
| 10 | 60 | o |
| 15 | 70 | x |
| 20 | 80 | x | x: not good
□: normal
o: good
□: very good

If the weight of the first beads 366i and the second beads 369i respectively included in the plurality of projections 364i and the protecting layer 368i constituting the optical sheets is set as described above, there is an effect that the light refractive property is further improved.

It is shown in Table 4 the weight of the first beads 366i and the weight of the second beads 369i, which are set identically and the degree of light refractive property accordingly. However, the weights of the first beads 366i and the second beads 369i included in the plurality of projections 364i and the protecting layer 3681, respectively, may be included in different ratios.

Hereinafter, luminance curves of light output through the optical sheet formed according to this document and the conventional lenticular lens sheet or microlens array sheet are compared and described.

Figure 19:
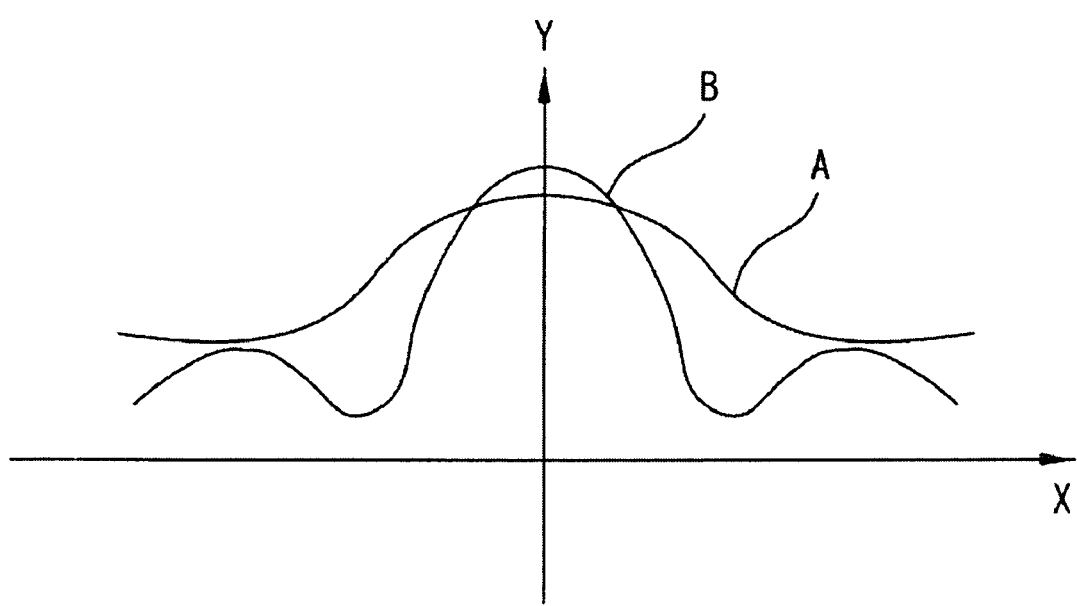
FIG. 19 is a graph showing luminance curves of light respectively output through the optical sheet according to this document and a conventional lenticular lens sheet or microlens array sheet.

In FIG. 19, "A" indicates the luminance curve of the optical sheet of this document and "B" indicates the luminance curve of the conventional lenticular lens sheet or microlens array sheet. Further, an X axis denotes an angle with respect to a normal direction of the optical sheet of this document and the conventional lenticular lens sheet or microlens array sheet and a Y axis denotes the intensity of luminance of the optical sheet of this document and the conventional lenticular lens sheet or microlens array sheet.

From FIG. 19, it can be seen that the optical sheet of this document has a low intensity of luminance within a range of a constant angle when compared with the conventional lenticular lens sheet or microlens array sheet. It can also be seen that when the conventional lenticular lens sheet or microlens array sheet is deviated from a constant angle, luminance abruptly decreases, but the luminance is smoothly decreased in the optical sheet of this document. Accordingly, the optical sheet of this document is advantageous in that it can provide a wide valid viewing angle while maintaining the uniformity of luminance.

Third Embodiment

Figure 20:
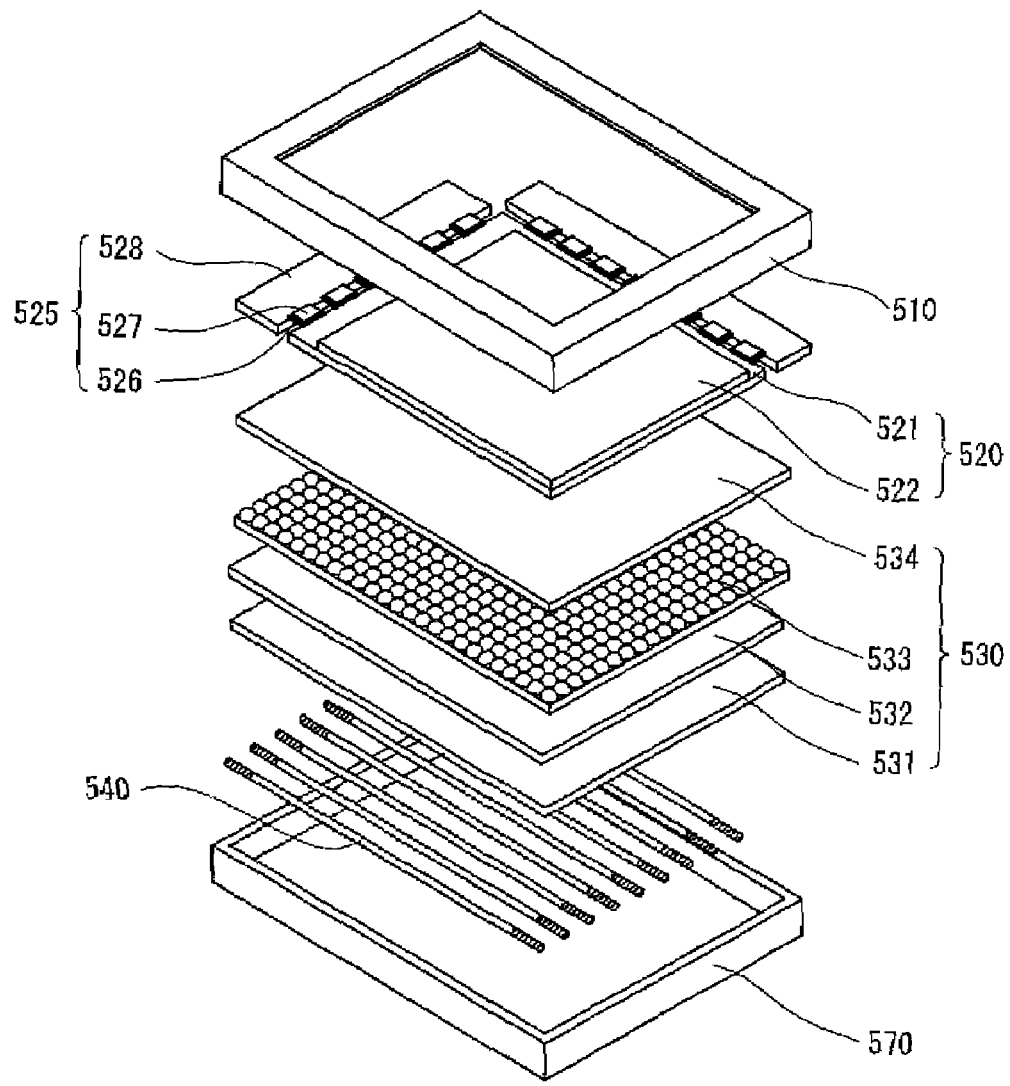
FIG. 20 is a dismantled perspective view of a liquid crystal display in accordance with a third embodiment of this document.

Referring to FIG. 20, a liquid crystal display may comprise light sources 540 for outputting light. The liquid crystal display may further comprise a base film positioned on the light sources 540, a plurality of projections, which is positioned on one surface of the base film and comprises a first resin and a plurality of first beads, and an optical sheet 533 in which the content of the first beads may be 1 to 10 parts by weight based on 100 parts by weight of the first resin constituting the plurality of projections. Further, the liquid crystal display may comprise a liquid crystal panel 520 for displaying an image using light output from the light sources 540.

Here, the plurality of projections included in the optical sheet 533 may have the lenticular lens type as shown in FIGS. 1 to 3 and 5 to 9. Alternatively, the plurality of projections included in the optical sheet 533 may also have the micro lens type as shown in FIGS. 11 to 13 or 15 to 17.

Figure 4:
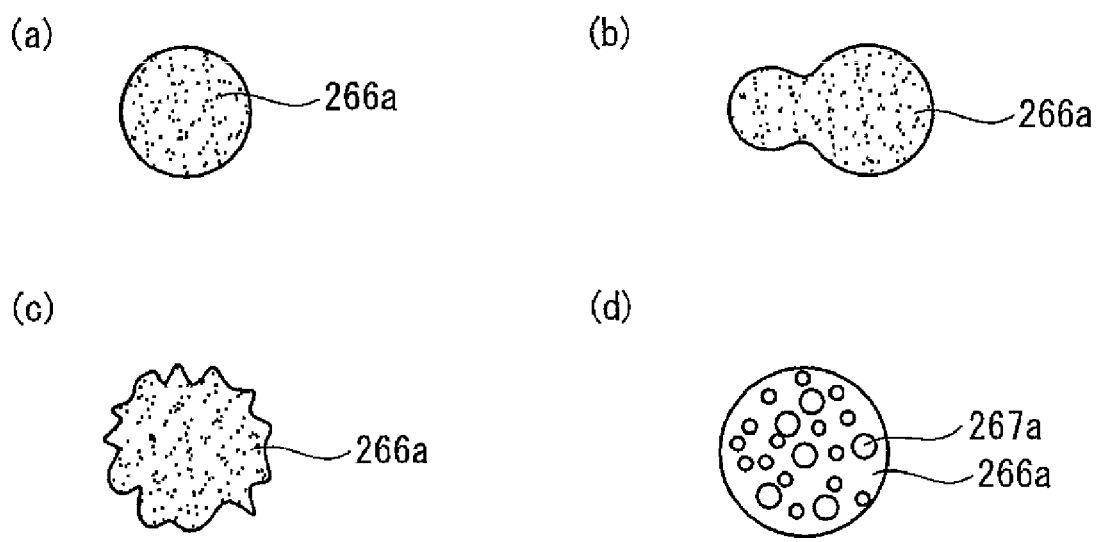
FIG. 4 is a view illustrating various embodiments of a bead.
Figure 14:
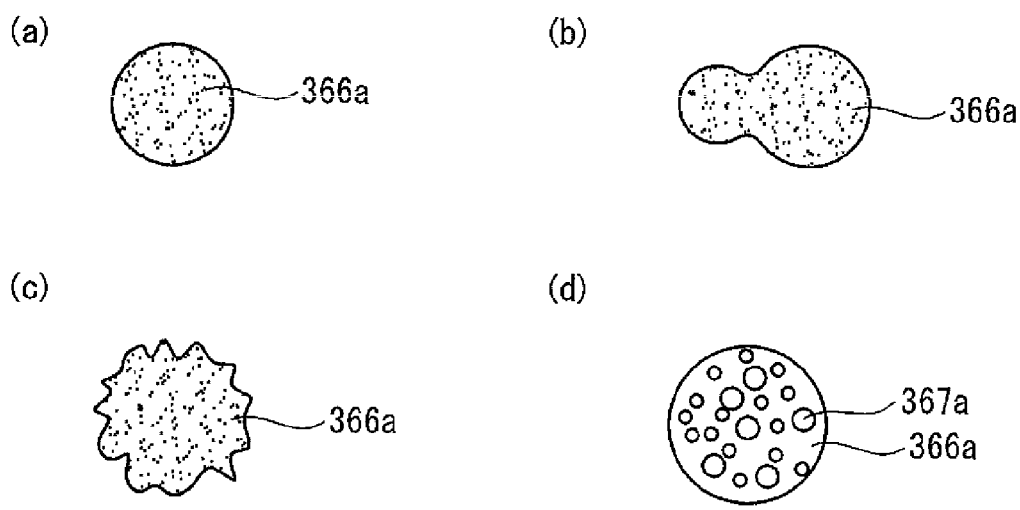
FIG. 14 is a view illustrating various embodiments of a bead.

Meanwhile, a second resin, a plurality of second beads, and a protecting layer in which the weight of the second beads is 10 to 50 parts by weight based on 100 parts by weight of the second resin constituting the protecting layer may be formed on the other surface of the base film constituting the optical sheet 533. In this case, when the plurality of projections is a lenticular lens, the optical sheet 533 may be positioned as shown in FIG. 10. Further, when the plurality of projections is a micro lens, the optical sheet 533 may be positioned as shown in FIG. 18. In addition, the plurality of first beads included in the plurality of projections may have a shape as shown in FIG. 4 or 14.

Here, the light sources 540 may employ any one of, for example, a cold cathode fluorescent lamp (CCFL), a hot cathode fluorescent lamp (HCFL), an external electrode fluorescent lamp (EEFL), and a light emitting diode (LED), but not limited thereto. Further, the light sources 540 may adopt any one of an edge type in which a lamp is positioned outside one side, a dual type in which a lamp is positioned on both sides, and a direct type in which a number of lamps are arranged in a straight line, but not limited thereto. These light sources 540 can be connected to an inverter and output light using power.

Figure 21:
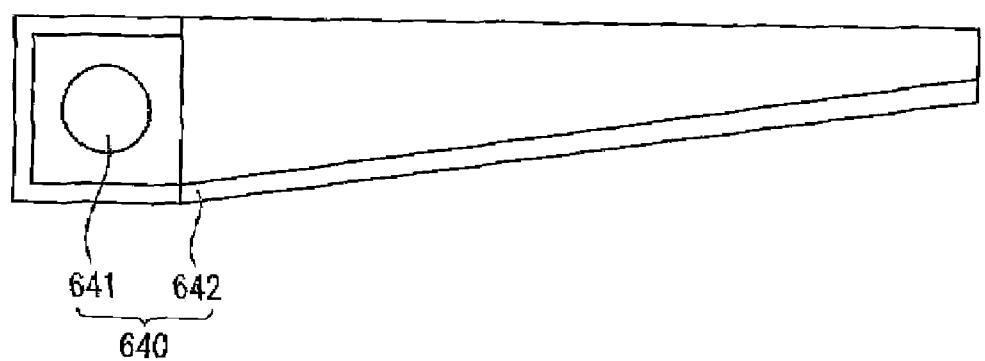
FIG. 21 is an exemplary view of an edge light source.

The light source 540 shown in FIG. 2 illustrates a direct type as an example. Unlike the above, an edge type light source 640 is illustrated in FIG. 21. The edge type light source 640 as shown in FIG. 21 may comprise a lamp 641 and a light guide plate 642 for guiding light output from the lamp 641.

Meanwhile, the liquid crystal display may further comprise the liquid crystal panel 520 for displaying an image, and an upper casing 510 and a lower casing 570 in which the light sources 540 are accommodated. The lower casing 570 can accommodate the light sources 540. The liquid crystal panels 520 may be positioned on the light sources 540 at specific intervals. The liquid crystal panel 520 and the light sources 540 may be fixed by the upper casing 510 coupled to the lower casing 570 and may be protected by the upper casing 510.

An aperture portion through which an image display region of the liquid crystal panel 520 is exposed may be provided on a top surface of the upper casing 510. A mold frame (not shown) in which peripheral portions of a number of optical film layers 530 are seated may be further included between the liquid crystal panel 520 and the light sources 540.

The liquid crystal panel 520 may have a structure in which a front plate 522 having color filters formed therein and a rear plate 521 having thin film transistors formed therein are coalesced together with liquid crystal intervened there between. This liquid crystal panel 520 has sub pixels arranged in matrix form. The sub pixels are independently driven by the thin film transistors. Each of the sub pixels controls the arrangement of liquid crystal according to a difference voltage between a common voltage, which is supplied to a common electrode, and a data signal, which is supplied to pixel electrodes through the thin film transistors, and thereby controls light transmittance, so that an image can be displayed.

Further, a driver 525 may be connected to the rear plate 521 of the liquid crystal panel 520. The driver 525 may comprise a plurality of film circuits 526 and a printed circuit board 528. The film circuits 526 have driving chips 527 for driving data lines and gate lines of the liquid crystal panel 520, respectively, mounted thereon and have one lateral portions coupled to the rear plate 521. The printed circuit board 528 may be connected to the other lateral portions of the plurality of film circuits 526.

The film circuits 526 having the driving chips 527 mounted thereon may have a chip on film (COF) or tape carrier package (TCP) type. However, the driving chips 527 may be directly mounted on the rear plate 521 using a chip on glass (COG) method or may be formed on the rear plate 521 in a formation process of thin film transistors.

Here, the plurality of optical film layers 530 disposed between the liquid crystal panel 520 and the light sources 540 may further comprise a diffusion plate 531, a diffusion sheet 532, a protecting sheet 534 and the like in addition to the above optical sheet 533.

The above-described liquid crystal panel 520 can display an image on each pixel according to a scan signal supplied through the gate line and a data voltage supplied through the data line.

Here, the scan signal may be a gate high voltage supplied only during 1 horizontal period and a pulse signal in which gate low voltages supplied in the remaining periods are alternated.

The thin film transistors included in the pixels are turned on when the gate high voltages are supplied from the gate lines and can supply the data voltages, which are supplied from the data lines, to liquid crystal cells.

The liquid crystal cell may be formed between a pixel electrode to which the data voltage is supplied from the data line, and the common electrode to which the common voltage is applied.

Accordingly, when the thin film transistor of each pixel is turned on and the data voltage is therefore applied to the pixel electrode, the liquid crystal display can display an image thereon as a difference voltage between the data voltage and the common voltage is charged in the liquid crystal cell.

On the contrary, if the gate low voltage is supplied from the gate line, the thin film transistor is turned off so the data voltage charged into the liquid crystal cell can be sustained during 1 frame period by a storage capacitor.

As described above, the liquid crystal panel 520 can repeat different operations according to the scan signals supplied through the gate lines.

As mentioned above, this document can provide the optical sheet which can efficiently utilize light output from the backlight unit, and the liquid crystal display, which can reduce power consumption according to the use of the battery and the light source, improve luminance, and have a wide optical viewing angle.

The foregoing embodiments and advantages are merely exemplary and are not to be construed as limiting this document. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112 (6).

What is claimed is:

1. An optical sheet comprising:
   a base film; and
   a plurality of projections including at least one of lenticular lens or micro lens, positioned on one surface of the base film,
   wherein the projections comprise:
   a first resin and a plurality of first beads; and
   about 1 to 10 parts by weight of a first bead based on 100 parts by weight of the first resin, and
   wherein at least one of widths and heights of two adjacent projections is different from each other.

2. The optical sheet of claim 1, further comprising:
   a protecting layer on the other surface of the base film,
   wherein the protecting layer comprises:
   a second resin and a plurality of second beads; and
   about 10 to 50 parts by weight of a second bead based on 100 parts by weight of the second resin.

3. The optical sheet of claim 1, wherein widths of the projections are substantially equal to each other.

4. The optical sheet of claim 1, wherein widths of the projections change in a random manner.

5. The optical sheet of claim 1, wherein widths of the projections change in a periodic manner.

6. The optical sheet of claim 1, wherein heights of the projections are substantially equal to each other.

7. The optical sheet of claim 1, wherein heights of the projections change in a random manner.

8. The optical sheet of claim 1, wherein heights of the projections change in a periodic manner.

9. The optical sheet of claim 1, wherein the first beads are attached to an exterior surface of each projection with a periodic pattern or a random pattern.

10. A liquid crystal display comprising:
    a light source;
    an optical sheet including: a base film; a plurality of projections including a lenticular lens or micro lens, positioned on one surface of the base film; and
    a liquid crystal panel displaying an image using light produced by the light source;
    wherein the projections comprise:
    a first resin and a plurality of first beads; and
    about 1 to 10 parts by weight of a first bead based on 100 parts by weight of the first resin, and
    wherein at least one of widths and heights of two adjacent projections is different from each other.

11. The liquid crystal display of claim 10, further comprising:
    a protecting layer on the other surface of the base film,
    wherein the protecting layer comprises:
    a second resin and a plurality of second beads; and
    about 10 to 50 parts by weight of a second bead based on 100 parts by weight of the second resin.

12. The liquid crystal display of claim 10, wherein widths of the projections are substantially equal to each other.

13. The liquid crystal display of claim 10, wherein widths of the projections change in a random manner.

14. The liquid crystal display of claim 10, wherein widths of the projections change in a periodic manner.

15. The liquid crystal display of claim 10, wherein heights of the projections are substantially equal to each other.

16. The liquid crystal display of claim 10, wherein heights of the projections change in a random manner.

17. The liquid crystal display of claim 10, wherein heights of the projections change in a periodic manner.

18. The liquid crystal display of claim 10, wherein the first beads are attached to an exterior surface of each projection with a periodic pattern or a random pattern.

* * * * *